United States Patent
Jakobsson

(10) Patent No.: US 9,519,761 B2
(45) Date of Patent: Dec. 13, 2016

(54) SYSTEMS AND METHODS FOR AUTHENTICATION USING LOW QUALITY AND HIGH QUALITY AUTHENTICATION INFORMATION

(75) Inventor: Bjorn Markus Jakobsson, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 329 days.

(21) Appl. No.: 13/605,886

(22) Filed: Sep. 6, 2012

(65) Prior Publication Data

US 2014/0068726 A1 Mar. 6, 2014

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *G06F 21/31* | (2013.01) | |

(52) U.S. Cl.
CPC ....... *G06F 21/31* (2013.01); *G06F 2221/2113* (2013.01)

(58) Field of Classification Search
CPC ........ G06F 21/30; G06F 21/31; G06F 21/313; G06F 21/316; G06F 21/32; G06F 21/33; G06F 21/34; G06F 21/35; G06F 21/36; G06F 21/40; G06F 21/46; H04L 9/32; H04L 9/3226; H04L 9/3228; H04L 9/3231
See application file for complete search history.

(56) References Cited

U.S. PATENT DOCUMENTS

| | | | | |
|---|---|---|---|---|
| 2004/0123106 A1* | 6/2004 | D'Angelo | ............... | G06F 21/32 713/171 |
| 2007/0079136 A1* | 4/2007 | Vishik | ............... | G06Q 20/0855 713/186 |
| 2008/0250477 A1* | 10/2008 | Samuelsson | ............ | H04L 9/321 726/4 |
| 2008/0263652 A1* | 10/2008 | McMurtry | ............ | G06F 21/335 726/9 |
| 2010/0115607 A1* | 5/2010 | Pratt | ....................... | G06F 21/31 726/18 |
| 2011/0072488 A1* | 3/2011 | Bi | ........................ | H04L 63/108 726/1 |
| 2011/0078773 A1* | 3/2011 | Bhasin | ............... | H04L 63/0838 726/5 |
| 2011/0314539 A1* | 12/2011 | Horton | .................... | G06F 21/35 726/20 |
| 2012/0054057 A1* | 3/2012 | O'Connell | ............. | G06F 21/36 705/26.1 |

(Continued)

*Primary Examiner* — Amir Mehrmanesh
*Assistant Examiner* — Quy Pham
(74) *Attorney, Agent, or Firm* — Haynes & Boone, LLP

(57) ABSTRACT

Systems, methods, and devices for authenticating a user are provided. A device includes one or more processors configured to determine if a requested service requires high quality authentication, generate a request for high quality authentication if the requested service requires high quality authentication, and generate a request for low quality authentication if the requested service requires low quality authentication. The device also include a network interface component coupled to a network, the network interface component configured to: receive the request for the service requiring authentication, and a memory, the memory storing high quality authentication information and low quality authentication information for authenticating the user.

24 Claims, 7 Drawing Sheets

(56) References Cited

U.S. PATENT DOCUMENTS

| | | | |
|---|---|---|---|
| 2013/0198832 A1* | 8/2013 | Draluk | G06F 21/31 726/16 |
| 2013/0200996 A1* | 8/2013 | Gray | A61B 5/1038 340/5.52 |
| 2013/0239191 A1* | 9/2013 | Bostick | G06F 21/316 726/7 |
| 2014/0007185 A1* | 1/2014 | Han | H04L 63/0861 726/1 |

* cited by examiner

SYSTEMS AND METHODS FOR AUTHENTICATION USING LOW QUALITY AND HIGH QUALITY AUTHENTICATION INFORMATION

BACKGROUND

1. Technical Field

Embodiments disclosed herein are related to systems and methods for authenticating a user using low quality and high quality authentication information. In particular, systems and methods disclosed herein may implement a tiered authentication system wherein requests for certain services require a user to provide high quality authentication information and other services only require a user to provide low quality authentication information.

2. Related Art

Network-enabled computing systems are becoming more and more prevalent in the daily lives and activities of people. Where once people would congregate around a television, radio, newspaper, or book, people now congregate around personal computers, tablet computers, smartphones, and set-top boxes such as video gaming systems. Each of these computing systems typically is tied to a specific user in some way and, in many cases, there are a number of accounts associated with each user on a computing system. When multiple users are using the computing system, this can be problematic as the user or owner of the computing system may be authenticated to one or more accounts at any time. If the user or owner permits another user to use the computing system, that other user may now have access to the accounts that the user or owner may be authenticated to. The other user may then be able to conduct financial transactions, send e-mail, and perform other functions using the user or owner's authenticated accounts. In many cases, the other user may not be intending anything malicious, but actually attempting to access their own account and perform functions associated with that account. A common solution is to have the user or owner log out of their accounts before letting the other user use their computing system and then authenticate to each of these accounts after the other user has completed their use of the computing system. However, this can be frustrating and time-consuming to users. Moreover, if the other user had authenticated to any of their accounts while using the computing system, the other user will also have to log out of each account that they had authenticated to, and then perform a full authentication if they use the computing system again.

Accordingly, there is a need for devices, systems, and methods for authenticating a user using low quality information and high quality information such that certain services only require the user to provide low quality information in order to be authenticated.

Figure 1:
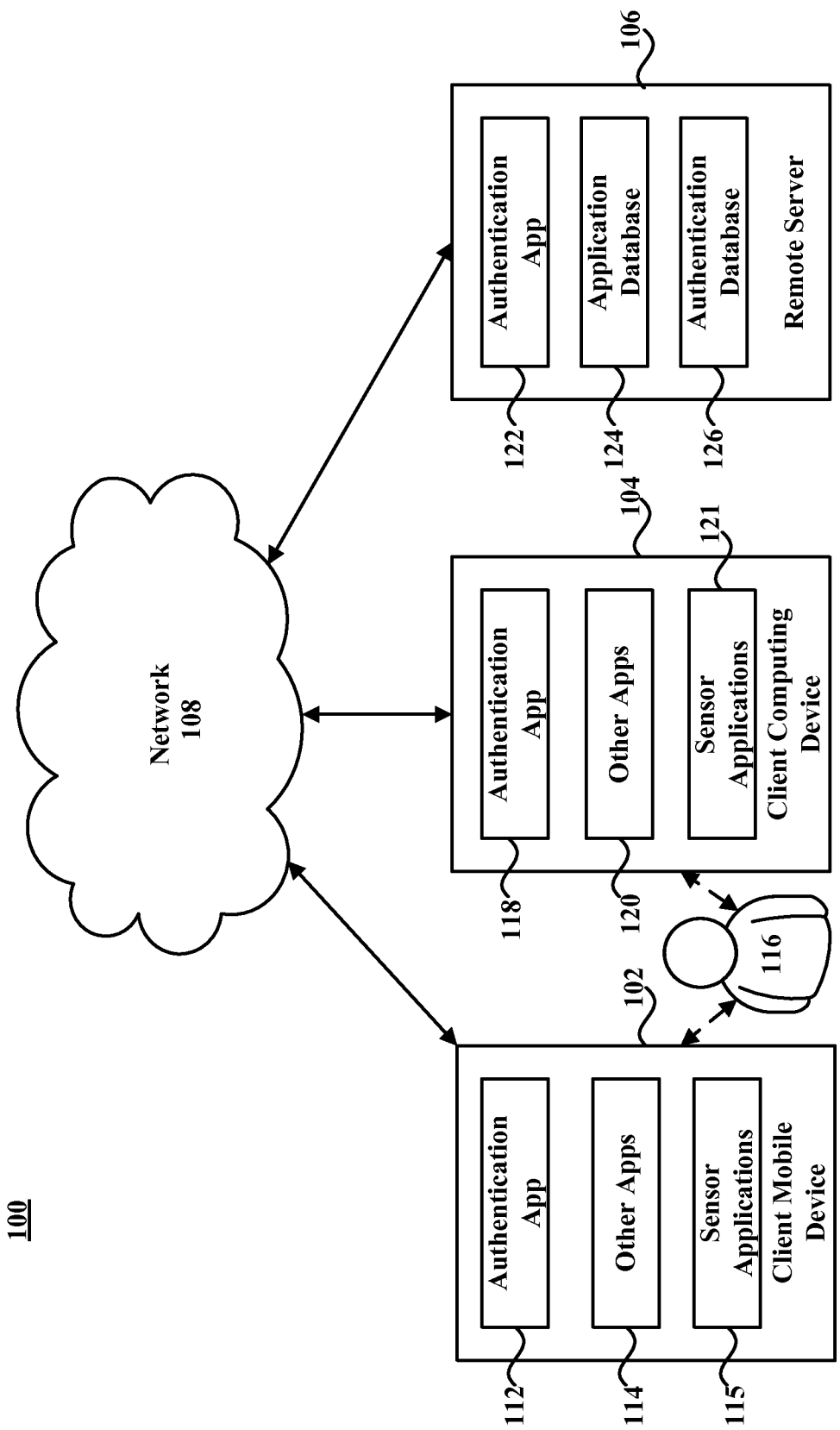
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

As discussed above, the need to continually log in, log out, authenticate, re-authenticate to accounts for security purposes when multiple users are using a computing system may be time consuming and frustrating to users. However, modern computing systems typically include a number of ways to monitor information about the users such that devices, systems, and methods can use this user information to determine a relative identity of the current user. This user information may be used in a way that creates a tiered authentication system, where certain actions require high quality authentication, such as fingerprint or other biometric identification, and other actions only require low quality authentication such as image recognition or characteristic accelerometer data. By using the tiered authentication system, the computing system will be able to determine if an authenticated user is currently using the computing system and prevent another user from performing certain actions if the other user is unable to pass a certain tier of authentication.

Consistent with some embodiments, there is provided a device that includes one or more processors configured to determine if a requested service requires high quality authentication, generate a request for high quality authentication if the requested service requires high quality authentication, and generate a request for low quality authentication if the requested service requires low quality authentication. The device also include a network interface component coupled to a network, the network interface component configured to: receive the request for the service requiring authentication, and a memory, the memory storing high quality authentication information and low quality authentication information for authenticating the user.

Consistent with some embodiments, there is also provided a non-transitory computer-readable medium having instructions for execution by one or more processors that, when executed, cause the one or more processors to perform a method for authenticating a user. The method includes receiving a request for a service that requires authentication, determining if the requested service requires high quality authentication, performing high quality authentication if the service requires high quality authentication, and performing low quality authentication if the service does not require high quality authentication.

Consistent with some embodiments, there is also provided a non-transitory computer-readable medium having instructions for execution by one or more processors that, when executed, cause the one or more processors to perform a method for authenticating a user. The method includes performing an initial high quality authentication, performing low quality authentication, receiving a request for a service, determining if the service requires additional authentication, permitting the service if the service does not require additional authentication, and performing additional authentication if the service requires additional authentication, wherein the additional authentication comprises multiple levels of authentication, the multiple levels of authentication corresponding to a relative strength of the authentication information provided by the user.

Consistent with some embodiments, there is also provided a non-transitory computer-readable medium having instructions for execution by one or more processors that, when executed, cause the one or more processors to perform a method for authenticating a user. The method includes transmitting a request for service, receiving a request for authentication, providing high quality authentication information if the request for authentication is a request for high quality authentication, providing low quality authentication information if the request for authentication is a request for low quality authentication information, and transmitting the captured high quality or low quality authentication information.

These and other embodiments will be described in further detail below with respect to the following figures.

FIG. 1 is a block diagram of a networked system 100, consistent with some embodiments. System 100 includes a client mobile device 102, a client computing device 104, and a remote server 106 in communication over a network 108. Remote server 106 may be a payment service provider server that may be maintained by a payment provider, such as PayPal, Inc. of San Jose, Calif. Server 106 may be maintained by other service providers in different embodiments. Remote server 106 may also be maintained by an entity with which sensitive credentials and information may be exchanged with client mobile device 102 and client computing device 104. Remote server 106 may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client mobile device 102, in one embodiment, may be implemented using any appropriate combination of hardware and/or software configured for wired and/or wireless communication over network 108. For example, client mobile device 102 may be implemented as a wireless telephone (e.g., smart phone), tablet, personal digital assistant (PDA), notebook computer, and/or various other generally known types of wired and/or wireless mobile computing devices. Consistent with some embodiments, client mobile device 102 may include any appropriate combination of hardware and/or software having one or more processors and capable of reading instructions stored on a non-transitory machine-readable medium for execution by the one or more processors. Consistent with some embodiments, client mobile device 102 includes a machine-readable medium, such as a memory (not shown) that includes instructions for execution by one or more processors (not shown) for causing client mobile device 102 to perform specific tasks. For example, such instructions may authenticating client mobile device 102 to remote server 106. Further, content may be content displayed by particular applications or "apps" 114 stored in a memory of client mobile device 102 and executed by one or more processors executing in client mobile device 102. One example of other apps is a browser app that displays content, such as a web page or a user interface using a browser. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Client mobile device 102 may also include sensor applications 115. Consistent with some embodiments, sensor applications 115 include applications which utilize sensor capabilities within client mobile device 102 to monitor characteristics of device 102, user 116, and/or the environment surrounding client mobile device 102. Such characteristics include obtaining images (video or still) of user 116 using camera functionalities of client mobile device 102, obtaining biometric information about user 116 using biometric functionality of client mobile device 102, obtaining accelerometer readings using an accelerometer in client mobile device 102, using a geographical location of user 116 and/or client mobile device using global positioning system (GPS) functionality of client mobile device 102 or obtaining a relative location using an internet protocol (IP) address of client mobile device 102. Consistent with some embodiments, characteristics of client mobile device 102, user 116, and/or the environment around client mobile device 102 may be captured using sensor applications 115 and used to provide low quality and high quality authentication information.

Client mobile device 102 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. Client mobile device 102 may also be a tablet computer, such as an iPad™ or other tablet computer running one of the aforementioned operating systems. It should be appreciated that, in various embodiments, client mobile device 102 may be referred to as a user device or a customer/client device without departing from the scope of the present disclosure.

Consistent with some embodiments, authentication app 112 may be a mobile authentication app, which may be used to authenticate user 116 to remote server 106 over network 108. Such authentication may be periodic, using both high quality authentication and lower quality authentication. For example, browser application 112 may be implemented as a web browser to view information available over network 108. Browser application 112 may include a software program, such as a graphical user interface (GUI), executable by one or more processors that is configured to interface and communicate with the remote server 106 or other servers managed by content providers or merchants via network 108. For example, user 116 is able to access websites to find and purchase items through a payment service provider, such as PayPal, as well as access user account information or web content. User 116, through client mobile device 102, may also communicate with remote server 106 to create an account, create user credentials to be associated with the account, authenticate and/or log in to the account using the created user credentials, and make a payment to a merchant or another individual connected to network 108.

Client mobile device 102, in one embodiment, may include other applications 114 as may be desired in one or more embodiments to provide additional features available to user 116, including accessing a user account with remote server 106. For example, applications 114 may include interfaces and communication protocols that allow the user to receive and transmit information through network 108 and to remote server 106 and other online sites. Applications 114 may also include security applications for implementing client-side security features, programmatic client applications for interfacing with appropriate application programming interfaces (APIs) over network 108 or various other types of generally known programs and/or applications. Applications 114 may include mobile apps downloaded and resident on client mobile device 102 that enables user 116 to access content through the apps.

Client computing device 104, which can be similar to client mobile device 102, may be a separate device, such as a PC or laptop or netbook, or may be omitted if the user will be using only client mobile device 102. Client computing device 104 may also be a set-top box (STB) such as provided by cable or satellite content providers, or a video game system console such as the Nintendo® Wii™, the Microsoft® Xbox 360™, or the Sony® PlayStation™ 3, or other video game system consoles. Both user devices may be used to access content with remote server 106 or other content provider. Client computing device 104, in one embodiment, may include a browser application 118 and other applications 120, similar to browser application 112 and applications 114 in client mobile device 102. Browser application 118 and applications 120 enable user 116 to access a payment provider web site and communicate with remote server 106, as well as other online sites. Client computing device 104 may also include sensor applications 121. Consistent with some embodiments, sensor applications 121 include applications which utilize sensor capabilities of client computing device 104 or peripherals coupled to client computing device 104 characteristics of device 104, user 116, and/or the environment surrounding client computing device 104. Such characteristics include obtaining images (video or still) of user 116 using camera functionalities of client computing device 104 or peripherals coupled to client computing device 104, obtaining biometric information about user 116 using a biometric reader coupled to client computing device 104, obtaining accelerometer readings using an accelerometer in client computing device 104 or peripherals coupled to client computing device 104, using a geographical location of user 116 and/or client computing device 104 using global positioning system (GPS) functionality of client computing device 104, a peripheral attached thereto, or obtaining a relative location using an internet protocol (IP) address of client computing device 104. Peripherals coupled to client computing device may correspond to video or other cameras coupled to client computing device 104, external sensors coupled to client computing device, or motion capture devices such as the Xbox™ Kinect™, the Nintendo® Wii™ WiiMote™, or the Sony® PlayStation™ Move™. Consistent with some embodiments, characteristics of client computing device 104, user 116, and/or the environment around client computing device 104 may be captured using sensor applications 121 and used to provide low or high quality authentication information.

Remote server 106 according to some embodiments, may be maintained by an online payment provider, which may provide processing for online financial and information transactions on behalf of user 116. Remote server 106 may include at least credential creation application 122, which may be adapted to interact with client mobile device 102 and/or client computing device 104 over network 108 to create credentials for user 116 to be associated with user 116. Remote server 106 may also include an application database 124 for storing various applications for interacting with client mobile device 102 and client computing device 104 over network 108 for purposes other than credential creation. Such applications may include applications for authentication, conducting financial transactions and shopping and purchasing items.

Figure 2:
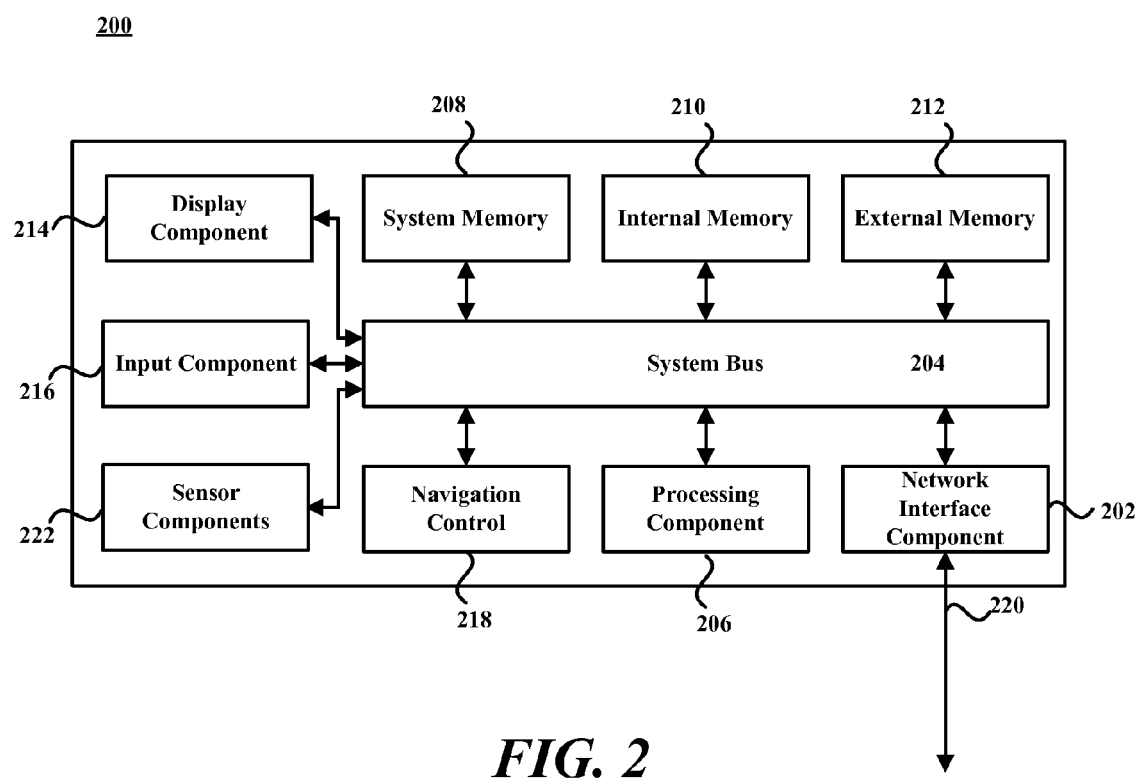
FIG. 2 is a diagram illustrating a computing system, consistent with some embodiments.

FIG. 2 is a diagram illustrating computing system 200, which may correspond to any of client mobile device 102, client computing device 104, or remote server 106, consistent with some embodiments. Computing system 200 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™, as would be consistent with client mobile device 102. Computing system 200 may also be a tablet computer such as the iPad™ or other similar device running the aforementioned operating systems. Computing system 200 may also be personal computer, laptop computer, netbook, or tablet computer as would be consistent with client computing device 104. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), a system memory component 208, which may correspond to random access memory (RAM), an internal memory component 210, which may correspond to read-only memory (ROM), and a external or static memory 212, which may correspond to optical, magnetic, or solid-state memories. Consistent with some embodiments, computing system 200 further includes a display component 214 for displaying information to a user 116 of computing system 200. Display component 214 may be an liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 116 of computing system 200 to input information to computing system 200. Such information could include payment information such as an amount required to complete a transaction, account information, authentication information, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 220 and network interface component 202. Communication link 220 may be wireless through a wireless data protocol such as Wi-Fi™, 3G, 4G, HDSPA, LTE, RF, NFC, or through a wired connection. Network interface component 202 may include an antenna, either separate or integrated, to enable transmission and reception via communication link 220. Received program code may be executed by processing component 206 as received and/or stored in memory 208, 210, or 212.

Computing system 200 may also include sensor components 222. Sensor components 222 provide sensor functionality for sensor apps 115 and 121, and may correspond to sensors built into client mobile device 102 or client computing device 104 or sensor peripherals coupled to client mobile device 102 or client computing device 104. Sensor components 22 may include any sensory device that captures information related to the environment of and around client mobile device 102, client computing device 104, and/or user 116. Sensor components 222 may include camera and imaging components, accelerometers, biometric readers, GPS devices, motion capture devices, and other devices that are capable of providing information about client mobile device 102, client computing device 104, user 116, or an environment therearound. Consistent with some embodiments, sensor components 222 may be configured to collect information to be used as low or high-quality authentication.

Figure 3:
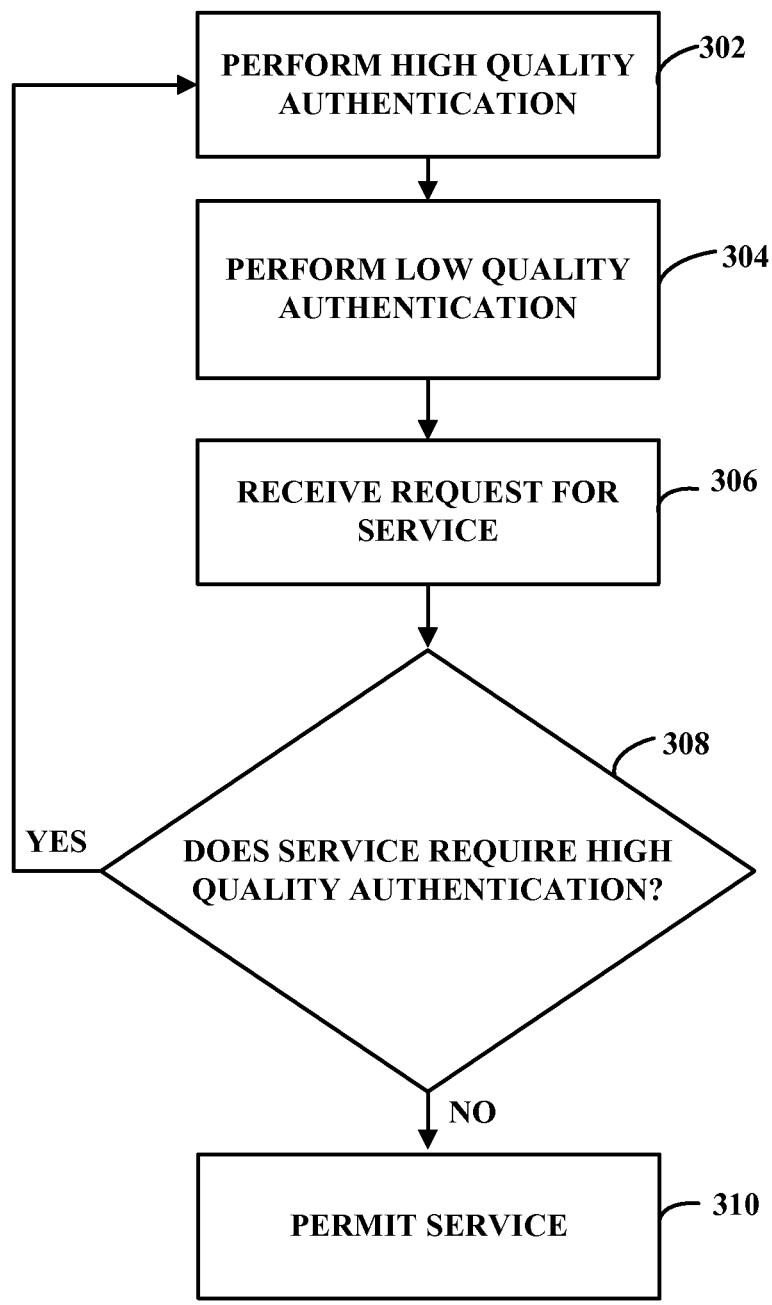
FIG. 3 is a flowchart illustrating a method for authenticating a user using high quality and low quality authentication, consistent with some embodiments.

Consistent with some embodiments, user 116 using computing system 200 that may correspond to either client mobile device 102 or client computing device 104 may wish to interact with remote server 106. In order to access services offered by remote server 106, user 116 may be required to authenticate to remote server 106. Such authentication may be a high quality authentication such as providing credentials such as a user name and password, or providing biometric information such as a fingerprint scan or an iris scan. Once a high quality authentication has been performed, user 116 may be permitted limited interaction with remote server based on low quality authentication, such as image recognition, accelerometer data, a measured finger size, voice recognition, and geographical location. The low quality authentication may be performed on demand or periodically, and may be performed automatically. The limited interaction may be set by user 116 or by remote server 106 such that certain minor or unimportant actions may be performed even if user 116 fails the low quality authentication (possibly indicating a different user) while important or major interactions require uninterrupted periods of successful low quality authentication or additional high quality authentications. The limit on interactions may refer to monetary amounts when monetary transactions are involved, or credential access if user settings are involved FIG. 3 is a flowchart illustrating a method for authenticating a user using high quality and low quality authentication, consistent with some embodiments. For the purpose of illustration, FIG. 3 will be described with reference to FIGS. 1 and 2. The method shown in FIG. 3 may be embodied in computer-readable instructions for execution by one or more processors in processing component 206 such that the steps of the method may be performed by remote server 106. As shown in FIG. 3, remote server 106 may initially require user 116 interacting with remote server 106 through client mobile device 102 or client computing to perform a high quality authentication to remote server 106 to access services provided by remote server 106 (302). Consistent with some embodiments, high quality authentication may include receiving specific user credentials, such as a password and user name, and matching the credentials to user credentials stored in remote server 106. High quality authentication may also include receiving biometric information, such as a fingerprint scan, iris scan, or other biometric information, and matching the received biometric information with biometric information stored on remote server 106. High quality authentication may also include multiple levels of authentication that is stronger and more secure than low quality authentication, the "levels" of authentication corresponding to their relative strength and security. The levels of authentication referred to herein as "high-quality" "medium-quality" and "low-quality" do not necessarily refer to specific authentication requirements but, instead, may refer to authentication requirements relative to the previously performed authentication. For example, if a user initially performs a successful high-quality authentication, subsequent authentications referred to as being "low-quality" or "medium" quality" may refer to authentications that require authentication information that is of lesser strength or security than the previously performed "high-quality" authentication. Similarly, if a user has performed a successful "low-quality" authentication and then requests a service that requires a "medium-quality" authentication or a "high-quality" authentication, these may refer to authentications that require authentication information that is of higher strength or security than the previously performed "low-quality" authentication.

Referring back to FIG. 3, if remote server 106 is unable to successfully authenticate user 116 using high quality authentication, the authentication fails, and remote server 106 may require user 116 to attempt authentication again. If remote server 116 successfully authenticates user 116, remote server 106 may perform low quality authentication (304). According to some embodiments, the authentication may be periodic and remote server 106 may require that client mobile device 102 or client computing device 104 use sensor applications 115 or 121 and sensor components 222 to obtain information for use in low quality authentication that may be transmitted to remote server 106. The information for low quality authentication may be obtained periodically and/or obtained automatically by client mobile device 102 or client computing device 104. Sensor information may include images, motions, global positions, or additional biometric information of user 116. For example, sensor components 222 may include a camera or other imaging component wherein sensor applications 115 or 121 will periodically capture an image of user 116 and compare each image to a previous image to determine if user 116 remains the same. Using image recognition techniques, facial features, hair or eye color, or clothing colors may be compared to determine if user 116 is using computing system 200. Alternatively, sensor components 222 may include an accelerometer wherein sensor applications 115 or 121 may measure an acceleration of client computing system 200 as it is used by user 116 to determine information about how user handles computing system 200. In addition, if user 116 is using client mobile device 102, sensor application 115 may use accelerometer to determine a gait of user 116 to distinguish from the gait of other users. Sensor components 222 may also include a global positioning system (GPS) sensor that measures the global position of computing system 200. Sensor applications 115 or 121 may periodically monitor the global position of computing system 200 to determine movement of computing system 200, which could be indicative of user 116 no longer being in control of computing system 200, or user 116 no longer being within a secure environment whereas a stable global position of computing system 200 may indicate that computing system 200 remains in control of user 116. Sensor components 222 may also determine how user 116 interacts with client mobile device 102 or client computing device 104. For example, if client mobile device 102 includes a touch screen, user 116 may interact with the touch screen in a particular way that is capturable by sensor components 222 and may be used in low quality authentication. These low quality authentication techniques provided by sensor components 222 are provided for example only and are not limiting. Any information that could be captured by sensor components 222 individually, or in combination, could be used to provide low quality authentication. Low quality authentication may also include multiple levels of authentication that is weaker and less secure than high quality authentication, the "levels" of authentication corresponding to their relative strength and security.

Figure 4:
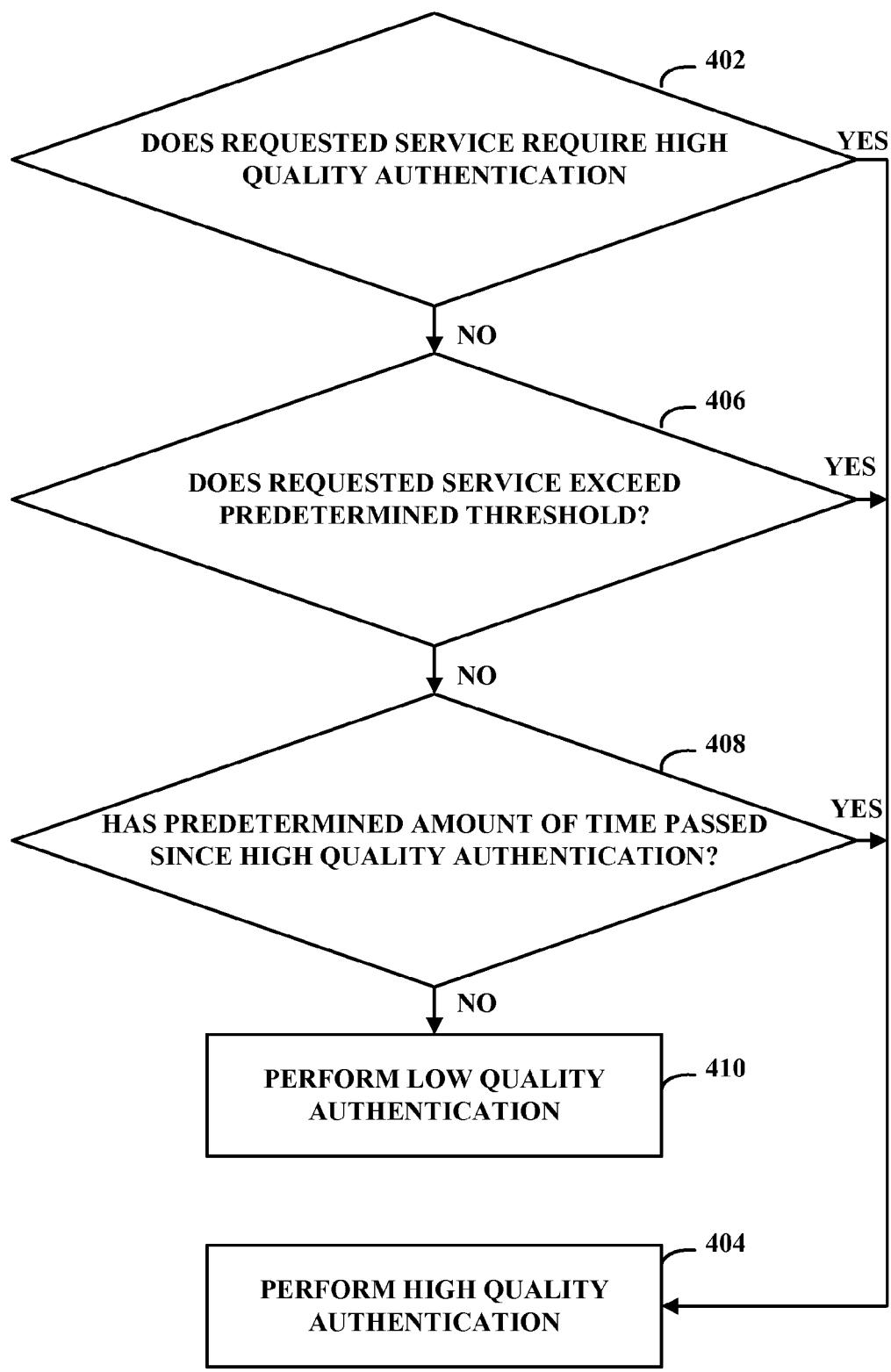
FIG. 4 is a flowchart illustrating a method for determining if a requested service requires high quality authentication, consistent with some embodiments.

Returning to FIG. 3, remote server 106 may receive a request for a service from user 116 through client mobile device 102 or client computing device 104 (306). After receiving such a request, remote server 106 may determine if the service requires a high quality authentication for allowing the service (308). Consistent with some embodiments, user 116 or remote server 106 may designate certain services as requiring high quality authentication. Such services may be account management services, monetary transactions above a certain predetermined amount, services requested after a low quality authentication has failed, services requested after a predetermined amount of time has passed since the last high quality authentications. Remote server 106 may designate such services based on user 116 history or the type of service being requested. FIG. 4 illustrates a method for determining if a service requires high quality authentication according to some embodiments, and will be discussed in greater detail below. If remote server 106 determines that the requested service does not require high quality authentication, remote server 106 may permit the requested service (310). However, if remote server 106 determines that the requested service requires high quality authentication, remote server 106 will require that user 116 perform high quality authentication 302. While the steps shown in FIG. 3 are described as being performed by remote server 106, some steps may be performed locally by client mobile device 102 or client computing device 104 alone, or in combination with remote server 106.

FIG. 4 is a flowchart illustrating a method for determining if a requested service requires high quality authentication, consistent with some embodiments. For the purpose of illustration, FIG. 4 will be described with reference to FIGS. 1 and 2. The method shown in FIG. 4 may be embodied in computer-readable instructions for execution by one or more processors in processing component 206 such that the steps of the method may be performed by remote server 106. As shown in FIG. 4, remote server 106 may perform a series of checks to determine if a requested service requires high quality authentication. For example, remote server may determine if the requested service is a service that always requires high quality authentication (402). Certain services such as account services that may include changing a user name, password, billing information, financial information, etc., may be of sufficient importance to remote server 106 or user 116 that high quality authentication is always required. Consistent with some embodiments, user 116 or remote server 106 may be able to designate whether certain services should always require high quality authentication. If remote server 106 determines that the requested service is one that requires high quality authentication, user 116 will be required to perform high quality authentication (404). If remote server 106 determines that the requested service does not require high quality authentication, it may perform an additional check, such as determining if the requested action exceeds a predetermined threshold (406). Consistent with some embodiments, the threshold may include a monetary threshold if the requested service is related to a financial or monetary transaction. According to such embodiments, user 116 or remote server 106 may set a threshold of, for example, $10.00 wherein for any monetary transaction below that amount low quality authentications is sufficient for permitting the transaction and for any transaction equal to or above that amount high quality authentication is required. The threshold may be related to user-associated credits or other thresholds. Other thresholds may be based on an anticipated risk of the requested service or user 116 that may be determined by a past history of user 116 stored on remote server 106, the frequency in which the requests are made, with a higher frequency of requests corresponding to an increased risk of an attack. The threshold may refer to an authentication score, wherein the authentication score is used to determine whether user 116 is required to perform a high quality authentication or a low quality authentication, and when an authentication should be performed. If remote server 106 determines that the requested service exceeds a predetermined threshold, user 116 will be required to perform high quality authentication (404). If remote server 106 determines that the requested service does not exceed a predetermined threshold, it may perform an additional check, such as determining if a predetermined amount of time has passed since user 116 has performed a high quality authentication (408). The predetermined amount of time may be set by user 116 or remote server 106 so that user's 116 high quality authentication to remote server 106 times out after the predetermined amount of time. The predetermined amount of time may be a preference set by user 116, or may be a security measure implemented by remote server 106 based on user 116 history or location. If remote server 106 determines that a predetermined amount of time has passed since user 116 last performed a high quality authentication, user 116 will be required to perform high quality authentication (404). If remote server 106 determines that a predetermined amount of time since user 116 last performed a high quality authentication has not passed, user 116 may only be required to perform low quality authentication to access the requested service (410). Although the method illustrated in FIG. 4 only shows three checks for determining if a high quality authentication is required, the method is not so limiting as additional checks may be performed. Moreover, while the steps shown in FIG. 4 are described as being performed by remote server 106, some steps may be performed locally by client mobile device 102 or client computing device 104 alone, or in combination with remote server 106.

Figure 5:
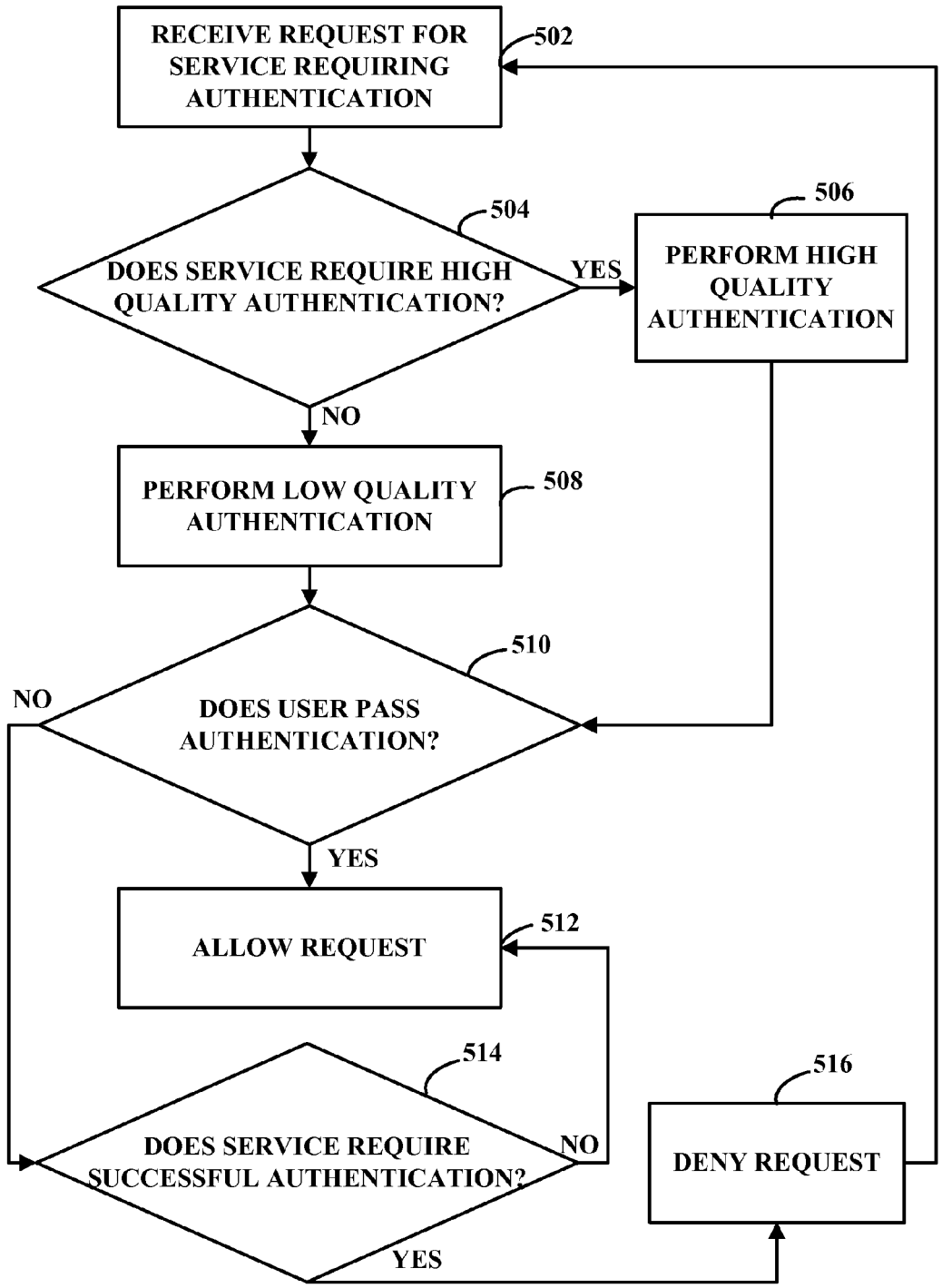
FIG. 5 is a flowchart illustrating a method for authenticating a user using high quality and low quality authentication, consistent with some embodiments.

FIG. 5 is a flowchart illustrating a method for authenticating a user using high quality and low quality authentication, consistent with some embodiments. For the purpose of illustration, FIG. 5 will be described with reference to FIGS. 1 and 2. The method shown in FIG. 5 may be embodied in computer-readable instructions for execution by one or more processors in processing component 206 such that the steps of the method may be performed by remote server 106. As shown in FIG. 5, remote server 106 may receive a request for a service requiring authentication (502). The request may be received from user 116 using client mobile device 102 or client computing device 104 through network 108. Remote server 106 may then determine if the requested service requires high quality authentication (504). As discussed above, remote server 106 may perform a series of checks such as shown in FIG. 4 to determine if the requested service requires high quality authentication. If the requested service requires high quality authentication, remote server 106 will request that user 116 perform high quality authentication (506). Consistent with some embodiments, high quality authentication may include receiving specific user credentials, such as a password and user name, and matching the credentials to user credentials stored in remote server 106. High quality authentication may also include receiving biometric information, such as a fingerprint scan, iris scan, or other biometric information, and matching the received biometric information with biometric information stored on remote server 106. High quality authentication may also include multiple levels of authentication that is stronger and more secure than low quality authentication, the "levels" of authentication corresponding to their relative strength and security. If the requested service does not require high quality authentication, remote server 106 may request that user 116 perform low quality authentication (508). According to some embodiments, remote server 106 may require that client mobile device 102 or client computing device 104 using sensor applications 115 or 121 and sensor components 222 to obtain information for use in low quality authentication that may be transmitted to remote server 106. The information may be obtained periodically and/or automatically by client mobile device 102 or client computing device 104. Sensor information may include images, motions, global positions, or additional biometric information of user 116. Low quality authentication may also include multiple levels of authentication that is weaker and less secure than high quality authentication, the "levels" of authentication corresponding to their relative strength and security.

Returning to FIG. 5, regardless of the type of authentication performed, low quality or high quality, remote server 106 will determine if user 116 passes the authentication (510). Determining if user 116 passes the authentication may include determining if high quality or low quality information provided by user over network 108 through client mobile device 102 or client computing device 104 matches information stored on remote server 106. If user 116 passes the authentication, remote server 106 will allow the request for the service (512). If user 116 does not pass the authentication, remote server 106 may first determine if the requested service requires successful authentication (514). According to some embodiments, user 116 or remote server 106 may determine that certain services are so insignificant that successful authentication is not required. If the service does not require successful authentication and user 116 failed the authentication, the request will be allowed (512). However, if the request for service does require successful authentication and user 116 failed the authentication, remote server 106 will deny request (516), and then repeat the method when receiving another request for service requiring authentication (502). While the steps shown in FIG. 5 are described as being performed by remote server 106, some steps may be performed locally by client mobile device 102 or client computing device 104 alone, or in combination with remote server 106.

Figure 6:
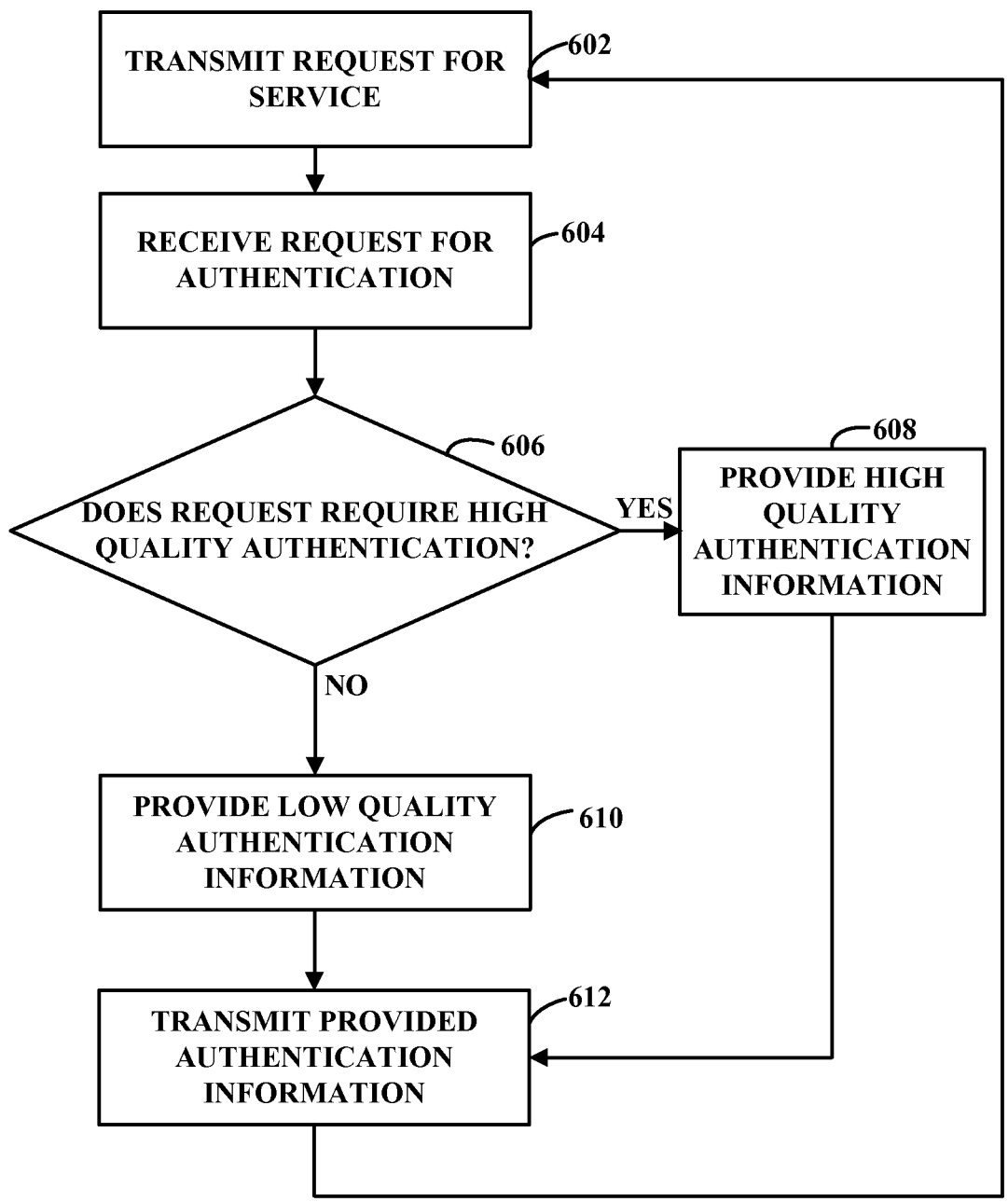
FIG. 6 is a flowchart illustrating a method for authenticating a user using high quality and low quality authentication, consistent with some embodiments.

FIG. 6 is a flowchart illustrating a method for authenticating a user using high quality and low quality authentication, consistent with some embodiments. For the purpose of illustration, FIG. 6 will be described with reference to FIGS. 1 and 2. The method shown in FIG. 6 may be embodied in computer-readable instructions for execution by one or more processors in processing component 206 such that the steps of the method may be performed by client mobile device 102 or client computing device 104. As shown in FIG. 6, client mobile device or client computing device 104 may transmit a request for a service requiring authentication (602). The request may be from user 116 and transmitted through network 108 to remote server 106. Remote server 106 may then receive the request and transmit a request for authentication to client mobile device 102 or client computing device 104 which is received by client mobile device 102 or client computing device 104 (604). Client mobile device 102 or client computing device 104 may then determined if the request requires high quality authentication (606). If the request requires high quality authentication, client mobile device 102 or client computing device 104 may provide high quality authentication information (608). Consistent with some embodiments, high quality authentication information may include specific user credentials, such as a password and user name, or biometric information, such as a fingerprint scan, iris scan, or other biometric information. Client mobile device 102 or client computing device 104 may have the high quality authentication information stored in a memory such as memory 208, 210, or 212, or client mobile device 102 or client computing device 104 may be required to capture the high quality authentication information. If the request does not require high quality authentication, client mobile device 102 or client computing device 104 may provide low quality authentication information (610). According to some embodiments, client mobile device 102 or client computing device 104 using sensor applications 115 or 121 and sensor components 222 may obtain information for use in low quality authentication that may be transmitted to remote server 106 that includes images, motions, global positions, or additional biometric information of user 116. Client mobile device 102 or client computing device 104 may have the low quality authentication information stored in a memory such as memory 208, 210, or 212, and be able to provide the information on demand or client mobile device 102 or client computing device 104 may be required to capture the low quality authentication information. Consistent with some embodiments, the providing or capturing of the low quality authentication information may be periodic. Once the requested authentication information has been provided, it is transmitted to remote server 106 through network 108 (612).

Figure 7:
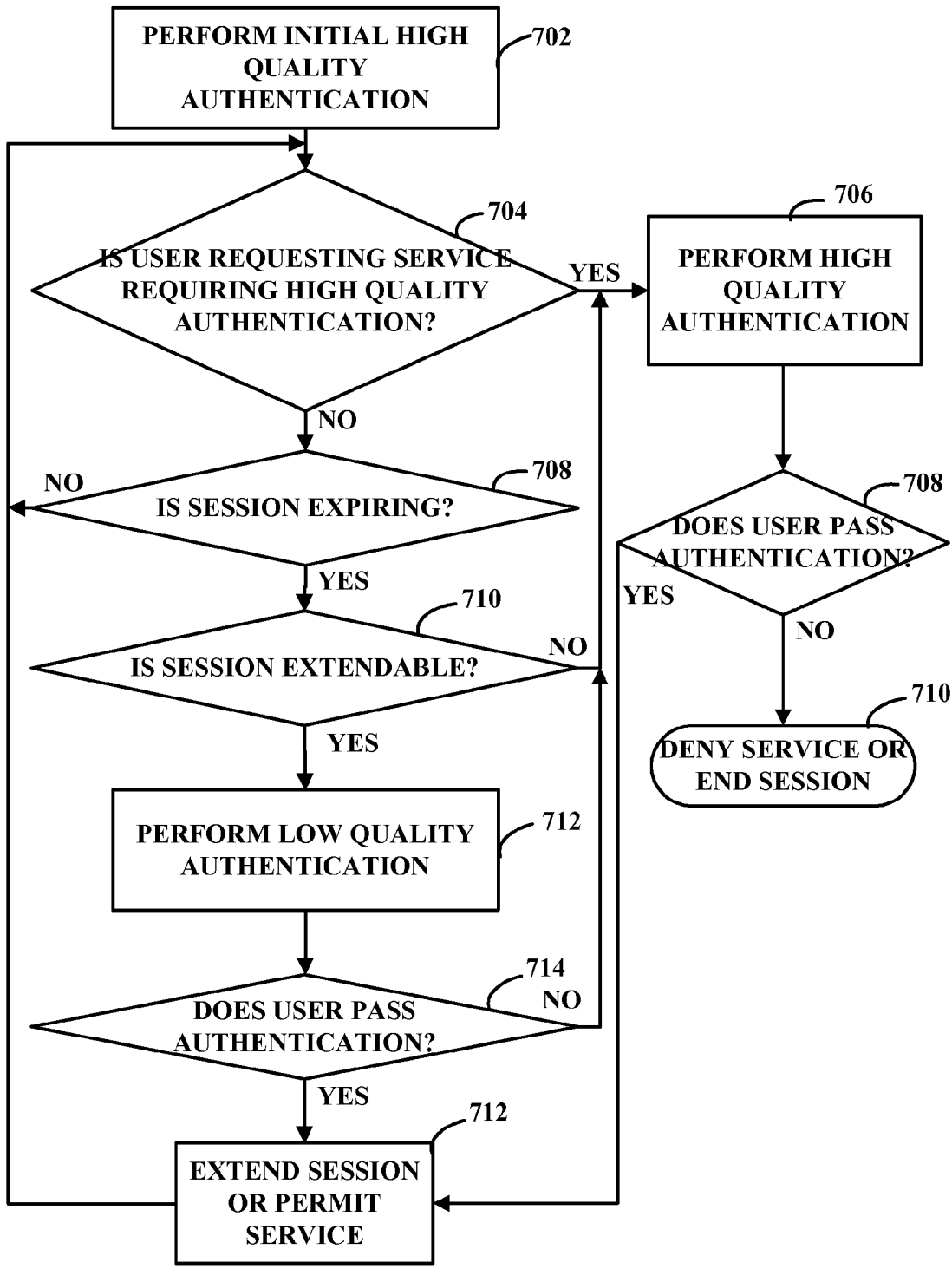
FIG. 7 is a flowchart illustrating a method for extending a session duration using multiple levels of authentication, consistent with some embodiments.

FIG. 7 is a flowchart illustrating a method for extending a session duration using multiple levels of authentication, consistent with some embodiments. For the purpose of illustration, FIG. 7 will be described with reference to FIGS. 1 and 2. The method shown in FIG. 7 may be embodied in computer-readable instructions for execution by one or more processors in processing component 206 such that the steps of the method may be performed by any of client mobile device 102, client computing device 104 or remote server 106. When user 116 is successfully authenticated to remote server 106, a session in which user 116 may be authenticated may be for a specific time duration. Using multiple levels of authentication may allow user 116 to extend that session for incremental periods of time that correspond to the quality of the authentication being performed. For example, successful low-quality authentication may provide a smaller session extension than a successful medium- or high-quality authentication. Further, user 116 may be permitted to continuously extend the session using low-quality authentication until a service is requested that requires a higher-level authentication, or if the total session duration reaches a predetermined non-extendable threshold. The method shown in FIG. 7 illustrates extending a session duration, consistent with this idea.

As shown in FIG. 7, user 116 may perform an initial high quality authentication to begin a session (702). Consistent with some embodiments, user 116 may authenticate to remote server for accessing and utilizing services provided by remote server 106, wherein a successful authentication will begin a session with remote server 106. The session may have a predetermined time limit, after which, the session will expire. Once user 116 has successfully performed the initial high quality authentication, the method may make a series of checks to determine if the session may be extended by user 116. For example, a check may be made to determine if user 116 is requesting a service or taking an action that requires high quality authentication (704). When user 116 requests a service or takes an action, remote server 106 may perform a series of checks such as shown in FIG. 4 to determine if the requested service requires high quality authentication. If the requested service requires high quality authentication, high quality authentication will be performed (706), a determination as to whether user passes the high quality authentication will be made (708), wherein user 116 will be denied the service if user 116 fails the authentication (710) and the service will be permitted if user passes the authentication (712). Consistent with some embodiments, high quality authentication may include receiving specific user credentials, such as a password and user name, and matching the credentials to user credentials stored in remote server 106 or on a local device such as client mobile device 102 or client computing device 104. High quality authentication may also include receiving biometric information, such as a fingerprint scan, iris scan, or other biometric information, and matching the received biometric information with biometric information stored on remote server 106 or on a local device such as client mobile device 102 or client computing device 104. High quality authentication may also include multiple levels of authentication that is stronger and more secure than low quality authentication, the "levels" of authentication corresponding to their relative strength and security.

Returning to FIG. 7, a periodic check may be made to determine if the session is expiring (714). If the session is expiring, a check is made to determine if the session is extendable (716). As discussed above, a session may be extendable for a predetermined amount of time, or a predetermined number of extensions. If the session is not extendable, user 116 will be required to perform a higher quality authentication in order to extend the session (706), wherein a determination as to whether user passes the high quality authentication will be made (708), wherein the session will end if user 116 fails the authentication (710) and the session will be extended if user passes the authentication (712). If the session is extendable, user 116 may be able to extend the session by performing low quality authentication (718). Low quality authentication may require that client mobile device 102 or client computing device 104 using sensor applications 115 or 121 and sensor components 222 to obtain information for use in low quality authentication that may be transmitted to remote server 106. The information may be obtained periodically and/or automatically by client mobile device 102 or client computing device 104. Sensor information may include images, motions, global positions, or additional biometric information of user 116. Low quality authentication may also include multiple levels of authentication that is weaker and less secure than high quality authentication, the "levels" of authentication corresponding to their relative strength and security. After performing low quality authentication, a determination will be made to see if user 116 passes the authentication (714), wherein if user 116 passes the low-quality authentication, the session will be extended (712). If user 116 fails the low-quality authentication, user 116 will be required to perform a higher quality authentication (706) to extend the session, wherein a determination as to whether user passes the high quality authentication will be made (708), wherein the session will end if user 116 fails the authentication (710) and the session will be extended if user passes the authentication (712). While the steps shown in FIG. 7 are described as being performed by remote server 106, some steps may be performed locally by client mobile device 102 or client computing device 104 alone, or in combination with remote server 106.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide methods, systems, and devices that provide a tiered authentication system permitting a remote server to require high quality authentication for certain services and only low quality authentication for other services. In particular, embodiments as described herein may improve current authentication schemes by allowing users and service providers the ability to require only low quality authentication for services which may not be as important and, thus, only warrant a low quality authentication whiles still requiring high quality authentication for important services. Moreover, embodiments as described herein may allow automatic and periodic low quality authentication that is less intrusive to users. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system, for authenticating a user, comprising:
a non-transitory memory storing instructions, high quality authentication information, and low quality authentication information; and
one or more hardware processors coupled to the non-transitory memory and configured to execute instructions to cause the system to perform operations comprising:
determining whether a requested service associated with a user triggers (i) a request for high quality authentication information from the user or (ii) a request for low quality authentication information from the user based on whether a previously performed authentication within a predetermined amount of time was a successful high quality authentication;
generating a request for low quality authentication information in response to determining that the previously performed authentication within the predetermined amount of time was a successful high quality authentication;
obtaining low quality authentication information responsive to the request for low quality authentication information;
in response to that determining the user does not pass a low quality authentication based on the obtained low quality authentication information, determining whether the requested service requires a successful authentication; and
responsive to determining that the requested service does not require a successful authentication, allowing the request for service.

2. The system of claim 1, wherein a request for high quality authentication information comprises a request for the user to provide at least one of a user name, a password, a biometric identifier, or a combination thereof.

3. The system of claim 1, wherein a request for low quality authentication information comprises a request for the user to provide at least one of an image of the user, a biometric identifier of the user, a location, sensor information, or a combination thereof.

4. The system of claim 1, wherein the operations further comprise: requesting the user to perform a low quality authentication on a predefined time schedule.

5. The system of claim 1, wherein the request for low quality authentication information comprises a plurality of requests for low quality authentication information.

6. A non-transitory machine-readable medium having stored thereon machine-readable instructions executable to cause a machine to perform operations comprising:
receiving, from a user, a request for a service that requires authentication;
determining whether the requested service triggers a high quality authentication information or a request for low quality authentication information based on a previously performed successful authentication within a predetermined amount of time;
performing a high quality authentication if the service triggers a request for high quality authentication information;
performing a low quality authentication if the service triggers a request for the low quality authentication information;
determining whether the requested service requires a successful authentication responsive to determining that the user does not pass the high quality authentication or the low quality authentication; and
allowing the request for service responsive to determining that the service does not require a successful authentication.

7. The non-transitory machine-readable medium of claim 6, wherein the operations further comprise:
determining whether the requested service triggers a request for high quality authentication information or a request for low quality authentication information based on an existence of a valid user session.

8. The non-transitory machine-readable medium of claim 6, wherein performing the high quality authentication comprises performing an authentication based on at least one of a user name, a password, a biometric identifier, or a combination thereof.

9. The non-transitory machine-readable medium of claim 6, wherein performing the low quality authentication comprises performing an authentication based on at least one of an image of the user, a biometric identifier of the user, a location, sensor information, or a combination thereof.

10. The non-transitory machine-readable medium of claim 6, wherein determining whether the requested service triggers a request for high quality authentication information comprises:
determining whether the requested service is a service that always triggers a request for high quality authentication information; or determining whether the requested service exceeds a predetermined risk threshold.

11. The non-transitory machine-readable medium of claim 6, wherein performing the high quality authentication comprises performing a plurality of authentications.

12. A non-transitory machine-readable medium having stored thereon machine-readable instructions executable to cause a machine to perform operations comprising:
performing an initial authentication successfully;
receiving, from a user, a request for a service;
determining that the requested service triggers a request for low quality authentication information in response to determining that the initial authentication was successfully performed within a predetermined amount of time and is a high quality authentication;
obtaining the low quality authentication information responsive to the request for low quality authentication information;
performing a low quality authentication based on the obtained low quality authentication information;
permitting the service responsive to determining that the low quality authentication is successfully performed;
in response to that determining the low quality authentication is not successfully performed, determining whether the requested service requires a successful authentication; and
responsive to determining that the requested service does not require a successful authentication, allowing the request for service.

13. The non-transitory machine-readable medium of claim 12, wherein performing the high quality authentication comprises:
requesting high quality authentication information from the user; and
receiving the requested high quality authentication information from the user.

14. The non-transitory machine-readable medium of claim 13, wherein the high quality authentication is performed based on at least one of a user name, a password, a biometric identifier, or a combination thereof.

15. The non-transitory machine-readable medium of claim 12, wherein a request for low quality authentication information comprises:
a request for at least one of an image of the user, a biometric identifier of the user, a location, sensor information, or a combination thereof.

16. The non-transitory machine-readable medium of claim 12, wherein determining that the service triggers a request for low quality authentication information when the initial authentication is a high quality authentication comprises:
determining whether the requested service is a service that always triggers a request for high quality authentication information; or
determining whether the requested service exceeds a predetermined risk threshold.

17. A non-transitory machine-readable medium having stored thereon machine-readable instructions executable to cause a machine to perform operations comprising:
transmitting a request for service;
receiving, from a user, a request for authentication information;
in response to receiving the request for authentication information, determining that the request for authentication information is a request for low quality authentication information, the determination being based on a previously performed successful authentication being a high quality authentication performed within a predetermined amount of time;
obtaining low quality authentication information, responsive to the request for low quality authentication information;
responsive to determining that the user does not pass a low quality authentication based on the obtained low quality authentication information, determining whether the requested service requires a successful authentication; and
responsive to determining that the requested service does not require a successful authentication, allowing the request for service.

18. The non-transitory machine-readable medium of claim 17, wherein the request for high quality authentication information comprises a request for at least one of a user name, a password, a biometric identifier, or a combination thereof.

19. The non-transitory machine-readable medium of claim 17, wherein a request for low quality authentication information comprises a request for at least one of an image of the user, a biometric identifier of the user, a location, sensor information, or a combination thereof.

20. The non-transitory machine-readable medium of claim 19, wherein the request for the low quality information comprises a request for periodically capturing, from the user, low quality authentication information.

21. The non-transitory machine-readable medium of claim 20, wherein periodically capturing the low quality authentication information comprises automatically capturing, without affirmatively requiring user action, from the user the low quality authentication information.

22. The method of claim 1, further comprising: determining whether the requested service triggers a request for high quality authentication information or a request for low quality authentication information based on an existence of a valid user session.

23. The non-transitory machine-readable medium of claim 12, wherein the operations further comprise: determining whether the requested service triggers a request for high quality authentication information or a request for low quality authentication information based on an existence of a valid user session.

24. The non-transitory machine-readable medium of claim 17, wherein the operations further comprise: determining whether the requested service triggers a request for high quality authentication information or a request for low quality authentication information based on an existence of a valid user session.

* * * * *